(12) United States Patent
Cohen et al.

(10) Patent No.: US 7,689,435 B2
(45) Date of Patent: Mar. 30, 2010

(54) METHOD AND APPARATUS FOR CREATING AND MANAGING COMPLEX BUSINESS PROCESSES

(75) Inventors: Mitchell Adam Cohen, Yorktown Heights, NY (US); Titania Mary Gupta, Hawthorne, NY (US); Laurent David Hasson, New York, NY (US); John Scott Houston, Hopewell Junction, NY (US); Jianren Li, Valhalla, NY (US); Rakesh Mohan, Cortlandt Manor, NY (US); Jakka Sairamesh, New York, NY (US); Josef Schiefer, White Plains, NY (US); Revathi Subramanian, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 2432 days.

(21) Appl. No.: 09/951,026

(22) Filed: Sep. 11, 2001

(65) Prior Publication Data

US 2003/0050881 A1 Mar. 13, 2003

(51) Int. Cl.
G06F 17/60 (2006.01)
G06F 17/30 (2006.01)
(52) U.S. Cl. .............................. 705/1.1; 705/7; 705/8; 705/9; 705/31; 705/80; 705/26; 705/37; 707/2; 707/3; 707/4; 707/5
(58) Field of Classification Search .................. None
See application file for complete search history.

(56) References Cited

U.S. PATENT DOCUMENTS 4,989,132 A * 1/1991 Mellender et al. ........... 717/139
5,396,630 A * 3/1995 Banda et al. ................ 719/316
5,706,452 A 1/1998 Ivanov
5,799,285 A 8/1998 Klingman
6,055,519 A * 4/2000 Kennedy et al. .............. 705/80

(Continued)

OTHER PUBLICATIONS

Dictionary Packet attached. 9 pages.*

(Continued)

*Primary Examiner*—John G. Weiss
*Assistant Examiner*—Matthew L. Brooks
(74) *Attorney, Agent, or Firm*—Sawyer Law Group P.C.

(57) ABSTRACT

A method and apparatus are disclosed for managing composite business processes that include multiple trading mechanisms, such as requests for quotes (RFQs), auctions and contracts, or repeat passes through a single trading mechanism. The independence of the individual business processes that manage each trading mechanism is maintained, while each individual business process can be connected to other business processes to form a composite business process. Each individual business process that may be followed by another business process to form a composite process must have at least one state labeled as a conversion state with a conversion transition to another business process. A conversion transition spans the gap between an end state of one business process and the start state of another subsequent business process. When a conversion state is entered by an object, a determination is made as to whether the object is being managed by a composite flow, and if so, what business process to use next. Conversion transitions execute any necessary steps to create a new object of the type required by the next business process in the composite process.

13 Claims, 5 Drawing Sheets

COMPOSITE FLOW MANAGEMENT DATABASE TABLE - 400

| | Flow_Id (440) | FlowType_Id (450) | Entity_Id (460) | CurState Identifier (465) | FlowStages (470) | CurrStage Index (475) | LastUpdate Time (480) | Flow Context (485) |
|---|---|---|---|---|---|---|---|---|
| | BIGINT NOT NULL | BIGINT NOT NULL | BIGINT NOT NULL | INTEGER NOT NULL | VARCHAR (254) | INTEGER | TIME STAMP | VARCHAR (254) |
| 405 | 5101 | 451 | 101 | 4 | 3101-5101 | 1 | 2001-06-25 10:51:02.86 | NULL |
| 406 | 3101 | 451 | 102 | 4 | 3101-5101 | 0 | 2001-06-25 10:54:19.472 | NULL |
| 407 | 2102 | 451 | 151 | 1 | 2102-2102 | 1 | 2001-06-26 09:40:16.27 | NULL |
| 408 | 3101 | 451 | 152 | 1 | NULL | 0 | 2001-06-26 14:00:38.323 | NULL |

U.S. PATENT DOCUMENTS

| | | | |
|---|---|---|---|
| 6,343,275 | B1 | 1/2002 | Wong |
| 6,470,338 | B1 | 10/2002 | Rizzo et al. |
| 6,470,388 | B1 | 10/2002 | Niemi et al. |
| 6,665,648 | B2 | 12/2003 | Brodersen et al. |
| 6,763,353 | B2 * | 7/2004 | Li et al. .................. 707/4 |
| 6,813,278 | B1 * | 11/2004 | Swartz et al. ............ 370/466 |
| 6,820,266 | B1 * | 11/2004 | Minakawa et al. ......... 719/313 |
| 7,249,074 | B1 | 7/2007 | Land et al. |
| 2002/0026410 | A1 | 2/2002 | Woloshin et al. |
| 2002/0032590 | A1 | 3/2002 | Anand et al. |
| 2002/0069154 | A1 | 6/2002 | Fields |
| 2002/0133395 | A1 | 9/2002 | Hughes et al. |
| 2002/0161608 | A1 | 10/2002 | Loveland |
| 2003/0014368 | A1 | 1/2003 | Leurig et al. |
| 2003/0101133 | A1 | 5/2003 | DeFrancesco et al. |

OTHER PUBLICATIONS

Muth et al., "Enterprise-Wide Workflow Management Based on State and Activity Charts", in: A. Dogac, L. Kalinichenko, T. Özsu, A. Sheth (Eds.): Workflow Management Systems and Interoperability, Springer Verlag, (1998).

"Supply-Chain Operations Reference Model; Overview of SCOR Version 5.0," Supply-Chain Council, Inc., (2001), downloaded from www.supply-chain.org on Mar. 12, 2002.

xreferplus—logic—The American Heritage Concise Dictionary, 1 page.

Conditional (logic)—Encyclopedia Article About Conditional (logic), the freedictionary.com, 3 pages.

xreferplus—conditional—Academic Press Dictionary of Science Technology, 1 page.

The Authoritative Dictionary of IEEE Standards Terms, 10 pages, 7th Edition, Standards Information Network IEEE Press.

Newton, Harry, Newton's Telecom Dictionary, 10 pages, 20th updated and Expanded Edition, CMP Books.

Office Action mailed Sep. 4, 2008 for U.S. Appl. No. 09/951,028.
Response of Nov. 12, 2008 for U.S. Appl. No. 09/951,028.
Office Action mailed Sep. 4, 2008 for U.S. Appl. No. 09/951,027.
Response of Nov. 19, 2008 for U.S. Appl. No. 09/951,027.
Office Action mailed Jun. 10, 2008 for U.S. Appl. No. 09/951,024.
Response of Aug. 15, 2008 for U.S. Appl. No. 09/95,024.
Office Action mailed Sep. 4, 2008 for U.S. Appl. No. 09/951,029.
Response of Nov. 12, 2008 for U.S. Appl. No. 09/951,029.

Mark Tew, Power Point Presentation of Mealy and Moore Machine, retrieved from http://www.olemiss.edu/courses/EE/ELE_335/Spring2000/Htmlnotes/MealyMooreSTTSTD/index.htm, Mar. 14, 2000.

"Authoritative Dictionary of IEEE Standards Terms," Seventh Edition, Published by Standards Information Network, IEEE Press, p. 1102.

CaseMatch (received from the "wayback" machine; Note because there is a patent No. 6,470,338 which supports CaseMatch and was sufficient for a 102b rejection, Examiner has labeled CaseMatch (HomePage) for this Action.

Microsoft Press Computer Dictionary, Computer Reference, 9 pages, Third Edition, Microsoft Press USA.

Dictionary Definitions of "state machine", "state", "flag", "monitor", "transition", "flow", "domain", and "logic" have been attached and sent to Applicant.

Office Action issued Apr. 28, 2009 for the U.S. Appl. No. 09/951,027, 69 pages.

Whatis.com, "Finite State Machine", http://seachcio-midmarket.techmarket.com/sDefinition/0,sid183_gci213052,00.html.

Thiyagarajan Veluchamy, "Finite State Machine", http://thiyagarajan.wordpress.com/glossary/.

* cited by examiner

COMPOSITE FLOW DATABASE TABLE – 300

| | CompositeFlow_Id 340 | SingleFlow_Id 350 | Sequence 360 |
|---|---|---|---|
| | BIGINT NOT NULL | BIGINT NOT NULL | INTEGER NOT NULL |
| 305 | 6103 | 3101 | 1 |
| 306 | 6103 | 5101 | 2 |
| 307 | 6104 | 2102 | 1 |
| 308 | 6104 | 2102 | 2 |

FIG. 4

COMPOSITE FLOW MANAGEMENT DATABASE TABLE – 400

| | Flow_Id 440 | FlowType_Id 450 | Entity_Id 460 | CurState Identifier 465 | FlowStages 470 | CurrStage Index 475 | LastUpdate Time 480 | Flow Context 485 |
|---|---|---|---|---|---|---|---|---|
| | BIGINT NOT NULL | BIGINT NOT NULL | BIGINT NOT NULL | INTEGER NOT NULL | VARCHAR (254) | INTEGER | TIME STAMP | VARCHAR (254) |
| 405 | 5101 | 451 | 101 | 4 | 3101-5101 | 1 | 2001-06-25 10:51:02.86 | NULL |
| 406 | 3101 | 451 | 102 | 4 | 3101-5101 | 0 | 2001-06-25 10:54:19.472 | NULL |
| 407 | 2102 | 451 | 151 | 1 | 2102-2102 | 1 | 2001-06-26 09:40:16.27 | NULL |
| 408 | 3101 | 451 | 152 | 1 | NULL | 0 | 2001-06-26 14:00:38.323 | NULL |

FIG. 5

| EXEMPLARY PSEUDOCODE FOR CONVERSION TRANSITION – 500 |
|---|
| Obtain the FlowStages and CurrStageIndex fields for this object
Parse the FlowStages to find the current stage
If current stage is final stage
    End
Otherwise, determine whether the next stage is a repeat of the current flow
If so, then
    Save index of the next stage
    Continue to parse FlowStages entry for next distinct stage
If have multiple options
    Present choice to user
Update CurrStageIndex in Flow Instance table
Identify the source and target flow types
Look up the appropriate conversion method
Call the conversion method to perform cleanup, copy and set up functions
Raise event to move the new object past the START state |

FIG. 6

METHOD AND APPARATUS FOR CREATING AND MANAGING COMPLEX BUSINESS PROCESSES

CROSS REFERENCE TO RELATED APPLICATIONS

The present invention is related to United States Patent Application entitled "Method and Apparatus for Automatic Transitioning Between States in a State Machine That Manages a Business Process," Ser. No. 09/951,028 United States Patent Application entitled "Method and Apparatus for Managing The Versioning of Business Objects Using a State Machine," Ser. No. 09/951,027 United States Patent Application entitled "Method and Apparatus for Monitoring Execution of a Business Process Managed Using a State Machine," Ser. No. 09/951,025 United States Patent Application entitled "Method and Apparatus for Managing and Displaying User Authorizations for a Business Process Managed Using a State Machine," Ser. No. 09/951,024 and United States Patent Application entitled "Method and Apparatus for Managing a User Group List For a Business Process Managed Using a State Machine," Ser. No. 09/951,029, filed contemporaneously herewith, assigned to the assignee of the present invention and incorporated by reference herein.

FIELD OF THE INVENTION

The present invention relates generally to techniques for representing business processes as state machines, and more particularly, to a method and apparatus for creating and managing complex business processes.

BACKGROUND OF THE INVENTION

A composite business process uses multiple trading mechanisms, such as requests for quotes (RFQs), auctions and contracts, or repeat passes through a single trading mechanism, over the life cycle of a single business object. For example, the results of an RFQ may need to be converted to a contract before the transaction is complete, or an auction may be performed in multiple stages with the first stage identifying serious bidders who will be involved in any subsequent stages.

While the individual business processes within a composite business process are typically well defined, there is currently no effective mechanism for efficiently integrating the individual business processes within a larger composite business process. In addition, there is currently no automated way of converting and moving a business object from one trading mechanism type to another.

A number of techniques have been proposed or suggested for integrating individual business processes within a larger composite business process. For example, collaborative supply chain management approaches included, for example, in the WebSphere Business Integrator from IBM Corp., and event-driven process chain (EPC) systems, such as those developed by IDS Scheer AG of Germany, provide flexibility in creating dynamic flows of business objects. These approaches, however, do not integrate existing stand-alone business processes to create a single fixed sequence composite business process in a structured way.

Likewise, systems that are designed to support the specific needs of a complex business process do not provide sufficient flexibility and an efficient use of system resources. Specifically, any variation to an individual component business process within a larger composite business process forces the replication of the entire composite business process, and a duplication of all of the resources that are required to manage the composite business process.

A need therefore exists for a simple and flexible mechanism for connecting established business processes together, without sacrificing system resources or the needs of businesses to maintain an established process. Yet another need exists for creating and managing composite business processes that allows existing shared business processes to remain independent, yet be easily connected together to address the needs of the business.

SUMMARY OF THE INVENTION

Generally, a method and apparatus are disclosed for managing composite business processes that include multiple trading mechanisms, such as requests for quotes (RFQs), auctions and contracts, or repeat passes through a single trading mechanism. The independence of the individual business processes that manage each trading mechanism is maintained, while each individual business process can be connected to other business processes to form a composite business process. According to one aspect of the invention, each individual business process that may be followed by another business process to form a composite process must have at least one state labeled as a conversion state with a conversion transition to another business process.

A conversion transition spans the gap between an end state of one business process and the start state of another subsequent business process. Thus, the end state of a business process may be designated as a conversion state when another business process may follow it. When a conversion state is entered by an object, a determination is made as to whether the object is being managed by a composite flow, and if so, determine what business process to use next. If the next business process to be executed is another pass through the same business process, the owner of the business object will be given the option of bypassing all subsequent rounds. If there is no desire or need to go through another round of the business process this method can move the object directly into the next business process in the sequence.

Conversion transitions are similar to other transitions with events, guards and actions. In addition to performing conventional transitioning functions, the conversion transitions of the present invention also execute any necessary steps to create a new object of the type required by the next business process in the composite process. This action copies all of the relevant data that must be carried forward from the previous object record, such as the composite sequence and index.

A more complete understanding of the present invention, as well as further features and advantages of the present invention, will be obtained by reference to the following detailed description and drawings.

DETAILED DESCRIPTION OF THE PREFERRED EMBODIMENTS

The present invention provides a state machine-based business process that creates and manages composite business processes that include multiple trading mechanisms, such as requests for quotes (RFQs), auctions and contracts, or repeat passes through a single trading mechanism. As used herein, the repetition of a single business process sequentially is referred to as a multi-round process and the combination of different business processes in a sequence is referred to as a multi-stage process. Overall, a combination of multiple stand-alone business processes, whether multi-round or multi-stage, will be referred to as a composite flow or composite business process. For example, one auction process followed by another "round" or "pass" of the same auction process is an example of a multi-round process. On the other hand, a first auction followed by another auction with dissimilar rules is not a multi-round process, but rather a multi-stage process. Likewise, an RFQ followed by a contract is an example of a multi-stage process. Thus, a multi-round process refers to a sequence in which the same process is used multiple times, and though, for example, auction parameters may change, the rules within the process are the same.

State Machine Terminology

Figure 1:
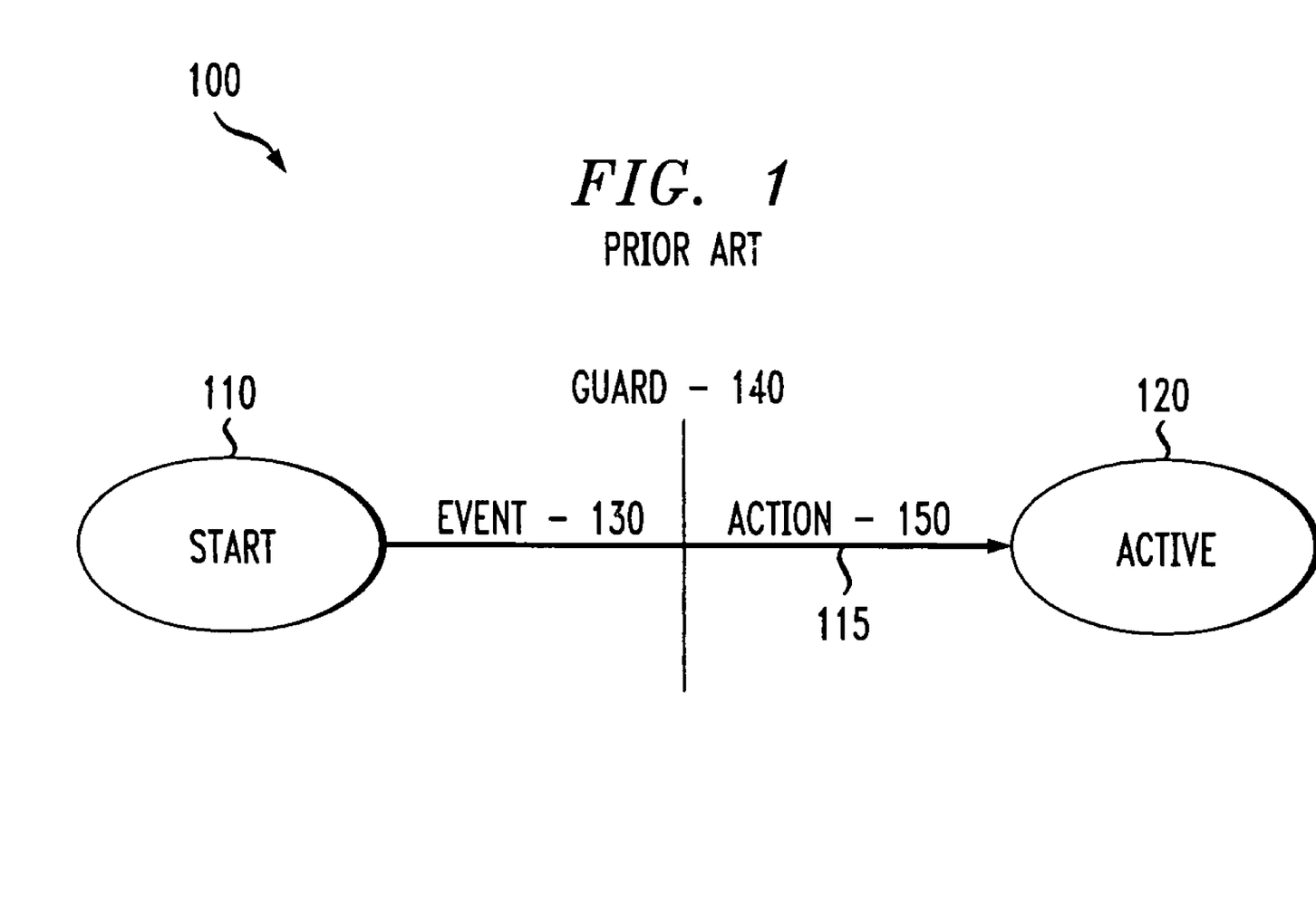
FIG. 1 illustrates an exemplary conventional state machine having two states for managing a business process.

Business processes can be represented using a state machine. State machines provide a way to control the set of events and actions that may be performed throughout the life cycle of a business object. The Unified Modeling Language (UML) provides a standardized syntax for describing state machines. FIG. 1 is an example illustrating a state machine 100 having two states 110, 120 with a single transition 115 leading from the Start state 110 to the Active state 120. The transition 115 is composed of three parts. First, there is an event 130 that defines what may cause this transition 115 to be attempted. Second, one or more guards 140 determine whether or not the transition 115 may be taken based upon some predefined criteria, such as the authority of the user or certain values associated with the business object. Finally, the action 150 provides a means for identifying logic that may act upon, or on behalf of, the object being managed by the state machine 100. Thus, if the transition 115 is allowed according to the guards 140, then the action 150 is performed and the object moves into the Active state 120. The various components of a transition 115 can be expressed using the notation "event [guard] action."

For a more detailed discussion of techniques for managing business processes using a state machine, see, for example, U.S. patent application Ser. No. 09/818,719, filed Mar. 27, 2001, entitled "E-Market Architecture for Supporting Multiple Roles and Reconfigurable Business Processes," August-Wilhelm Scheer, Aris—Business Process Modeling, Springer Verlag, 1999 or Peter Muth et al., Enterprise-Wide Workflow Management Based on State and Activity Charts, in A. Dogac, L. Kalinichenko, T. Ozsu, A. Sheth (Editors), Workflow Management Systems and Interoperability, Springer Verlag, 1998, each incorporated by reference herein.

Figure 2:
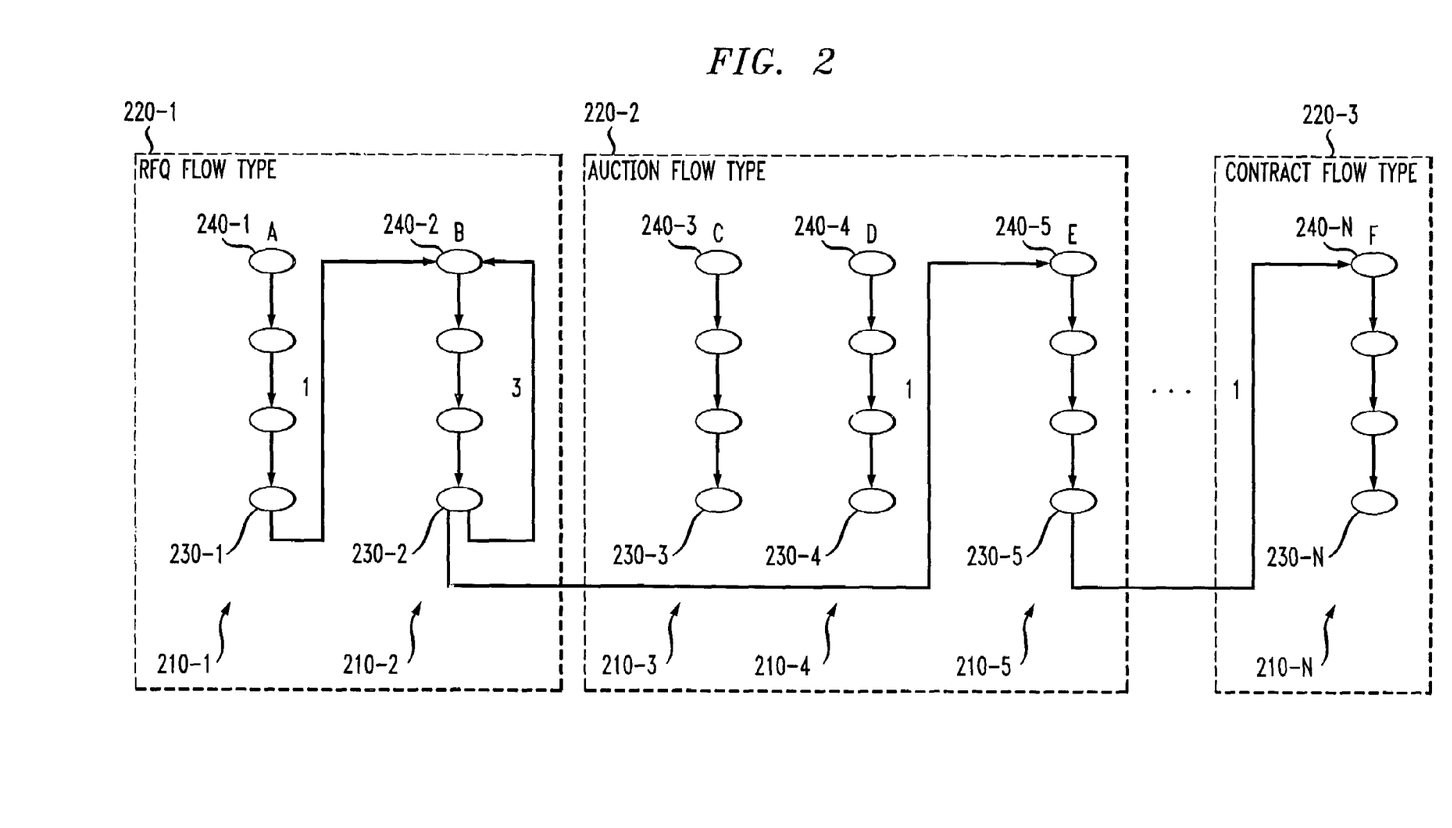
FIG. 2 illustrates a state machine for managing a composite business process in accordance with the present invention.

FIG. 2 illustrates a state machine 200 for managing a composite business process in accordance with the present invention. Once the state machine representations of individual business processes are prepared for an online marketplace, it is up to the user creating a business object to select the appropriate business process to manage the object. FIG. 2 illustrates an exemplary set of state machine representations for individual business processes 210-1 through 210-N (hereinafter, collectively referred to as individual business processes 210), each associated with one of three exemplary trading mechanisms 220-1 through 220-N (hereinafter, collectively referred to as trading mechanisms 220). The choice of a trading mechanism 220 and business process 210 for any given transaction will depend upon several factors, such as the objects being bought or sold, the other party involved in the transaction and the quantities of objects being handled.

When a transaction is part of a composite business process and requires more than a single pass through a single trading mechanism, the choices may be more complex. As shown in FIG. 2, the present invention maintains the independence of the individual business processes 210 and connects each individual business process 210 to form a composite business process using a corresponding conversion transition that spans the gap between an end state 230-$i$ of one business process 210-$i$ and the start state 240-$j$ of another business process 210-$j$. Thus, the end state 230-$i$ of one business process 210-$i$ may be designated as a conversion state when another business process may follow it. It is noted that the invention may be applied whether the composite process is a multi-round process or a multi-stage process. Conversion transitions are discussed further below in a section entitled "Conversion Transitions."

Thus, according to one feature of the present invention, each individual business process 210-$i$, which may have another business process 210-$j$ follow it, must have at least one state labeled as a conversion state. When a conversion state is entered by an object, the business process manager (that manages the flow of the state machine) will determine whether the object is being managed by a composite flow, and if so, determine what business process to use next.

If the next business process 210-$i$ to be executed is another pass through the same business process 210-$i$ (operating within a multi-round sequence), the owner of the business object will be given the option of bypassing all subsequent rounds. If there is no desire or need to go through another round of the business process 210-$i$, this method can move the object directly into the next business process 210-$i$+1 in the sequence. For example, if the composite business process is "auction-auction-contract," then after the first auction process, the owner can choose to go through the second auction or bypass the second auction and go directly to the contract process. This gives the owner not only the ability to link the processes together, but also, in this implementation, to bypass unnecessary passes of the same process. This can be useful if after the first pass through the auction process there is only one candidate buyer, so further rounds of the same auction are unnecessary.

FIG. 2 illustrates an exemplary composite flow. In this case, RFQ business process 210-1 (A) is used once, followed by four passes (initial plus three repeats) through RFQ business process 210-2 (B), one pass through auction business process 210-5 (E), and finally, one pass through contract business process 210-N (F). Thus, business processes 210-1 (A), 210-2 (B) and 210-5 (E) must have states that are defined as conversion states, thus allowing another flow to follow. As shown in FIG. 2, business process 210-2 may have multiple passes (rounds) (initial plus three repeats) through the same business process 210-2. The owner of the business object being managed in this composite flow may be given the opportunity to bypass passes 2, 3 and 4 of business process 210-2 (B) at the end of passes 1, 2 and 3. The initial pass through business process 210-2 (B) must be completed before the owner is given the choice to bypass subsequent passes. If this opportunity is taken, then the process will proceed directly to business process 210-5 (E).

A composite flow may be defined at several different points. The first option is to create the composite flow when the business processes themselves are created, thus defining a composite flow as one choice among the processes available to the user when creating an object. A composite flow may also be defined at the time that the business object is created, or the system may allow the object owner to establish the sequence of the business process one step at a time as each stage in the business process completes, in a similar manner to the capability provided by the ADocs and EPC systems.

Figure 3:
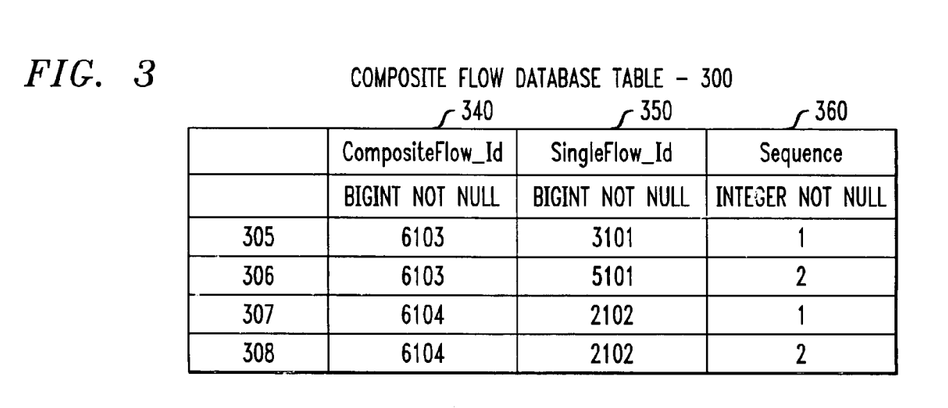
FIG. 3 is a sample table from an exemplary composite flow database table.

One exemplary method of recording the sequence of a predefined composite business flow is to use a database table to save the order of the business processes within the composite flow, as shown in FIG. 3. FIG. 3 is a sample table from an exemplary composite flow database table 300. The exemplary composite flow database table 300 includes a plurality of records, such as records 305-308, each associated with a pass through a business process. For each pass through a business process, the exemplary composite flow database table 300 identifies the composite flow in field 340 and the individual, stand-alone business processes in field 350. It is noted that the SingleFlow_Id identifier in field 350 may specify another composite flow. Finally, the composite flow database table 300 specifies the order in which the business processes are combined in field 360.

In the example shown in FIG. 3, there are two composite flows defined. One flow, id 6103, associated with records 305 and 306, is a multistage flow that consists of two business processes, business process 3101 followed by business process 5101. The other composite flow, id 6104, associated with records 307 and 308, is a multi-round flow with two passes through business process 2102.

Figure 4:
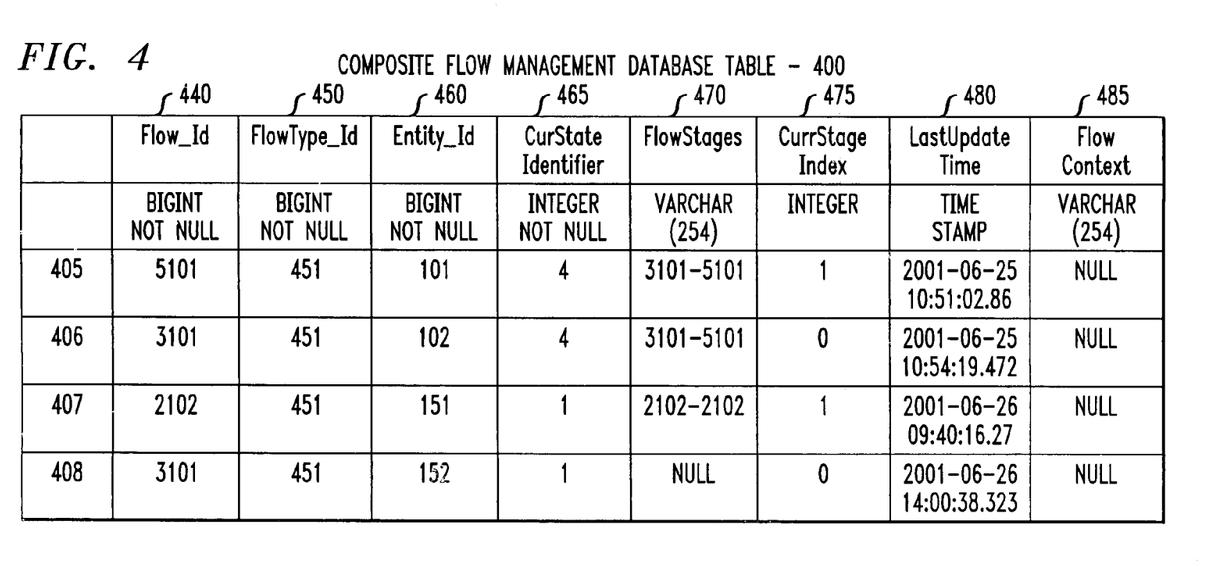
FIG. 4 is a sample table from an exemplary composite flow management database that shows how a business process manager may save information about a composite flow.

FIG. 4 is a sample table from an exemplary composite flow management database 400 that shows how the business process manager may save information about a composite flow. The table 400 provides a place for the business process manager to maintain information that is required to manage each business object. As shown in FIG. 4, the exemplary composite flow management database 400 includes a plurality of records, such as records 405-408, each associated with a different business object. For each business object, the exemplary composite flow management database 400 identifies the current individual business process managing the object in field 440 and the flow type of that business process in field 450. An entity identifier is recorded in field 460 that identifies the specific business object being managed.

Field 465 indicates the current state of an object within the current business process. Field 470 stores a string identifying the sequence of business process identifiers for an object. At the time that an object is created, if a composite flow is selected or created for that object, then the sequence of business process identifiers for that object can be saved as a string in field 470. In this manner, potential problems associated with someone changing the predefined composite flow sequence are avoided while an object is partially through the composite flow. The composite flow for an object cannot be altered after the object has been created. An index is stored in field 475 with object data to indicate the current stage of an object within the overall flow.

As each conversion state is reached, the FlowStages string is checked to determine the next flow, and if appropriate, the user is given a chance to bypass further rounds of the same business process. A conversion transition is then traversed to convert the object for the next business process, and the CurrStageIndex is updated to reflect the appropriate stage within the composite business process.

In the example of FIG. 4, there are two objects using multi-stage composite flows (Entity_Id 101 and 102), one object using a multi-round composite flow (Entity_Id 151), and one object which is using the 3101 business process alone.

Conversion Transitions

Conversion transitions are much like any other transitions with events, guards and actions, as discussed above in conjunction with FIG. 1. They may be either automatic transitions (using NULL events or some other means) or user-triggered transitions (e.g., the result of a user clicking on a button from a web browser). For a discussion of one suitable technique for automating transitions between states in a state machine that manages a business process, see United States Patent Application entitled "Method and Apparatus for Automatic Transitioning Between States in a State Machine That Manages a Business Process," Ser. No. 09/951,028, filed contemporaneously herewith, assigned to the assignee of the present invention and incorporated by reference herein.

In addition to performing conventional transitioning functions, the conversion transitions of the present invention must also execute any necessary steps to create a new object of the type required by the next business process in the composite process. This action copies all of the relevant data that must be carried forward from the previous object record, such as the composite sequence and index.

Figure 5:
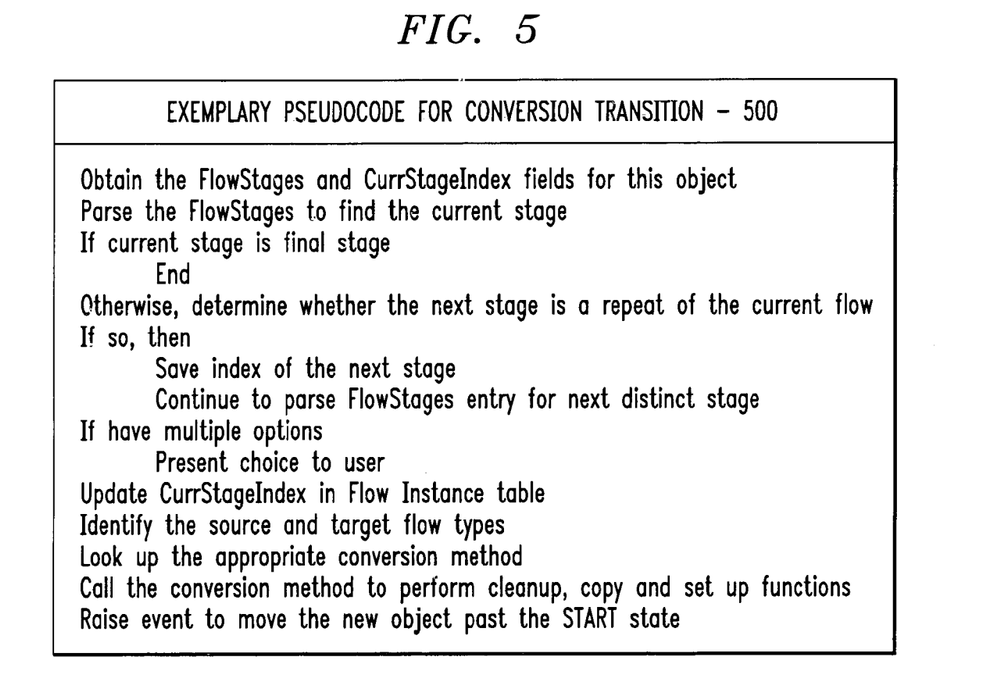
FIG. 5 provides exemplary pseudocode for a conversion transition in accordance with the present invention.

FIG. 5 provides exemplary pseudocode for a conversion transition in accordance with the present invention.

Among other benefits, the composite business process management techniques of the present invention provide an automated way of converting and moving a business object from one trading mechanism type to another (avoiding any manual copying by the user). This, by itself, is a significant improvement over what is currently available.

Figure 6:
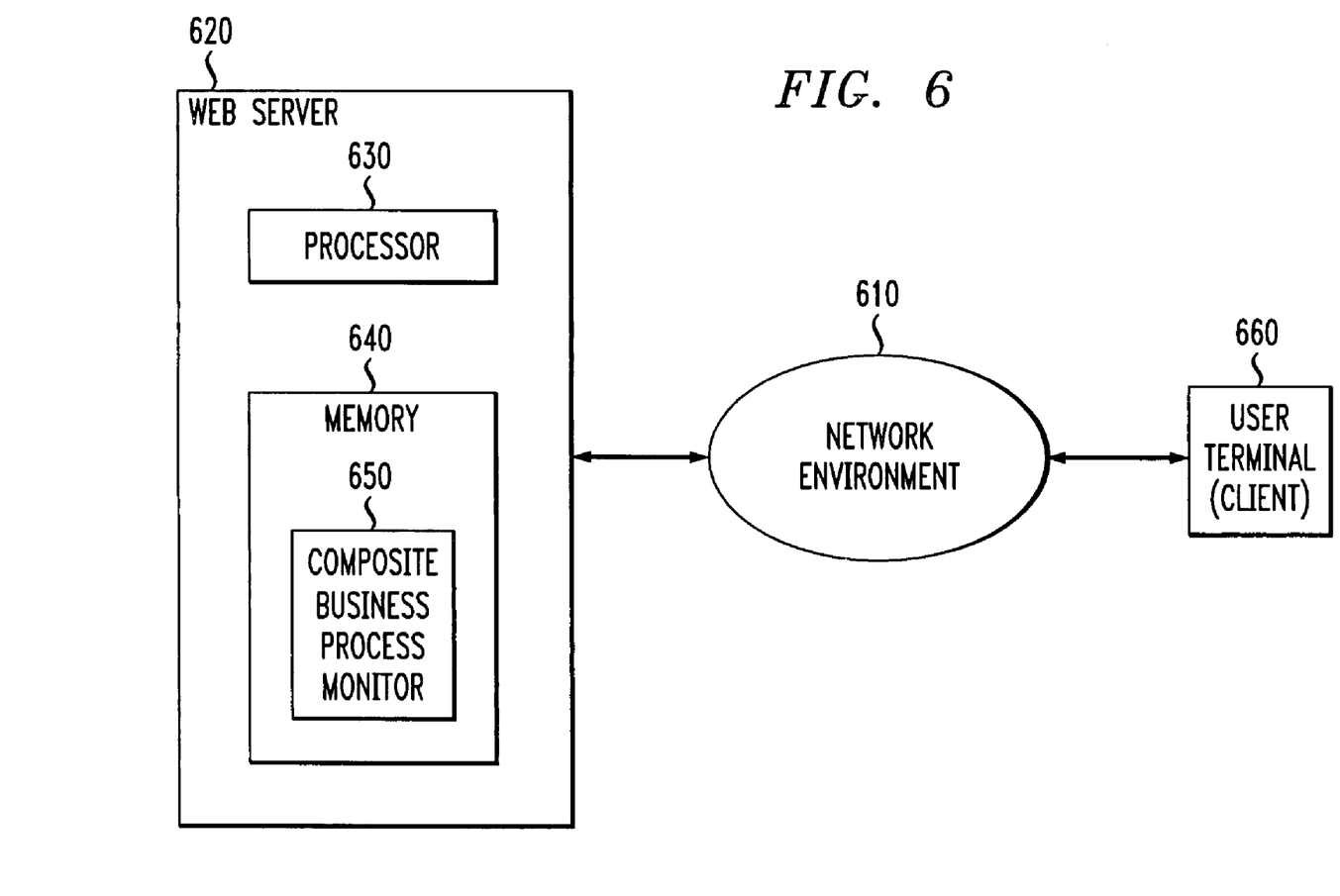
FIG. 6 illustrates an exemplary network environment in which the present invention can operate.

FIG. 6 illustrates an exemplary network environment 610 in which the present invention can operate. As shown in FIG. 6, a web server 620 communicates over a network 610 with a user terminal 660. For example, the user 660 may submit a response to an RFQ to the web server 620. The RFQ may need to be converted to a contract before the transaction is complete. The RFQ and contract processes that coordinate the flow of the business object through the RFQ and contract stages by the web server 620 may be managed in accordance with a composite business process manager 650 incorporating features of the present invention, as discussed above. The network 610 can be any wired or wireless network for transferring information, such as a data network or a telephone network.

Memory 640 will configure the processor 630 to implement the methods, steps, and functions disclosed herein. The memory 640 could be distributed or local and the processor 630 could be distributed or singular. The memory 640 could be implemented as an electrical, magnetic or optical memory, or any combination of these or other types of storage devices. The term "memory" should be construed broadly enough to encompass any information able to be read from or written to an address in the addressable space accessed by processor 630. With this definition, information on a network 610 is still within memory 640 of the web server 620 because the processor 630 can retrieve the information from the network 610.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It is to be understood that the embodiments and variations shown and described herein are merely illustrative of the principles of this invention and that various modifications may be implemented by those skilled in the art without departing from the scope and spirit of the invention.

What is claimed is:

1. A method for managing a composite business process comprised of a plurality of individual business processes using a state machine, said state machine having a plurality of states, said method comprising:
    determining with a processor that a business object is processed by a first one of the individual business processes, wherein the business object is of a first type required by said first individual business process, and wherein the composite business process is a multi-stage process that includes a sequence of the individual business processes;
    determining with the processor that the business object is designated to be processed by a second one of the individual business processes that is next in the sequence of the individual business processes after the first business process, the second individual business process implementing a different type of trading mechanism than the first individual business process,
    determining with the processor that the business object has reached an end state of the first individual business process and that the end state has also been designated a conversion state that is applicable to business objects designated for processing by the second individual business process, the conversion state having an associated conversion transition to a start state of the second individual business process;
    with the processor, causing the business object to traverse the conversion transition from the conversion state to the start state of the second individual business process; and
    in response to the conversion transition being traversed, performing with the processor at least one action associated with the conversion transition, the at least one action including converting the business object from the first type into a second type required by the second individual business process.

2. The method of claim 1, wherein said composite business process includes a multi-round process comprised of a repetition of one of said individual business processes.

3. The method of claim 1, wherein said first individual business process implements a request for quotes (RFQ) type of trading mechanism and said second individual business process implements a contract trading mechanism.

4. The method of claim 1, wherein said first individual business process implements an auction trading mechanism and said second individual business process implements a contract trading mechanism.

5. The method of claim 1, wherein only one of said first and second individual business processes implements an auction trading mechanism.

6. The method of claim 1, wherein the different types of trading mechanisms implemented by said first and second individual business processes include auctions, requests for quotes (RFQs), and contracts.

7. The method of claim 1, wherein said individual business processes are maintained as independent processes.

8. The method of claim 1, wherein a different business object that is not designated for use with the conversion state is not caused to traverse the conversion transition when reaching the end state of the first individual business process.

9. The method of claim 1, wherein the converting the business object includes copying relevant data that must be carried forward from a previous object record of the first type of business object to a new object record of the second type of business object for said second individual business process.

10. The method of claim 1, further comprising storing sequence information associated with the business object, the sequence information describing the sequence of the individual business processes to perform for the business object in the composite business process and designating the business object for processing by the second individual business process, wherein the sequence information is stored for the business object at a creation of the business object, and wherein:
    determining that the business object is designated to be processed by the second one of the individual business processes includes checking the stored sequence information associated with the business object.

11. The method of claim 10, further comprising storing an index associated with the business object, the index directly indicating a current stage of the business object within the composite business process.

12. A method for managing a composite business process comprised of a plurality of individual business processes using a state machine, said state machine having a plurality of states, said method comprising:
    determining with a processor that a business object is processed by a first one of the individual business processes, wherein the business object is of a first type required by said first individual business process, and wherein the composite business process is a multi-stage process that includes a sequence of the individual business processes;
    determining with the processor that the business object is designated to be processed by a second one of the individual business processes that is next in the sequence of the individual business processes after the first business process, the second individual business process implementing different rules than the first individual business process,
    determining with the processor that the business object has reached an end state of the first individual business process and that the end state has also been designated a conversion state that is applicable to business objects designated for processing by the second individual business process, the conversion state having an associated conversion transition to a start state of the second individual business process;
    with the processor, causing the business object to traverse the conversion transition from the conversion state to the start state of the second individual business process; and in response to the conversion transition being traversed, performing with the processor at least one action associated with the conversion transition, the at least one action including converting the business object from the first type into a second type required by the second individual business process.

13. The method of claim 12 wherein the first individual business process implements a first auction, and wherein the second individual business process implements a second auction using different rules than the first auction.

* * * * *